(12) United States Patent  (10) Patent No.: US 6,961,204 B2
Shimatani  (45) Date of Patent: Nov. 1, 2005

(54) HEAD POSITION CONTROL METHOD AND DISK STORAGE DEVICE (75) Inventor: Keiji Shimatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 10/366,497

(22) Filed: Feb. 13, 2003

(65) Prior Publication Data

US 2003/0218824 A1 Nov. 27, 2003

(30) Foreign Application Priority Data

May 24, 2002 (JP) .............................. 2002-150186

(51) Int. Cl.$^7$ .......................... G11B 5/596; G11B 5/55; G11B 21/02
(52) U.S. Cl. .............................. 360/78.06; 360/78.01; 360/75; 360/48
(58) Field of Search ............................. 360/57, 78.01, 360/78.04, 78.06, 78.08, 78.09, 69, 70, 77.01, 360/77.02, 77.05, 77.06, 77.07, 77.08, 78.07, 360/46, 48, 51, 75

(56) References Cited

U.S. PATENT DOCUMENTS 6,501,613 B1 * 12/2002 Shih ........................ 360/78.06

FOREIGN PATENT DOCUMENTS

JP  2003338145 A  * 11/2003  ........... G11B 21/08

* cited by examiner

Primary Examiner—David Hudspeth
Assistant Examiner—Jason Olson
(74) Attorney, Agent, or Firm—Greer, Burns & Crain, Ltd.

(57) ABSTRACT

A head position control method controls the speed of the head using the position and the speed detected from the servo information on the disk and directly detects the head speed. The speed detection pattern is assigned to the servo area of the disk, and the speed of the head is detected at the frequency of the regeneration signal. Therefore the speed of the head can be directly detected at the timing of the servo reading. By this, information on the head speed can be obtained with less error. Since there is no delay in the speed detection, the phase margin of the control system increases and stability improves.

14 Claims, 8 Drawing Sheets

$fe = Vx/x' = Vx/x + Vy/Y$ $fo = Vx/x - Vy/Y$ $Vy = (fe - fo) \cdot Y/2$

FIG. 8

S10 — SAMPLE REGENERATION SIGNAL

S12 — PERFORM FFT USING FLAT TOP WINDOW $\Rightarrow$ A

S14 — PERFORM FFT WITH SAMPLED SIGNAL MULTIPLY EACH FREQUENCY COMPONENT BY $2\pi jf$, AND PERFORM INVERSE FFT

S16 — PERFORM FFT WITH INVERSED FFT SIGNAL USING FLAT TOP WINDOW $\Rightarrow$ B

S18 — $fe = B/2\pi A$

S20 — $Vy = (fe - Vx/x) \cdot Y$

PRIOR ART

HEAD POSITION CONTROL METHOD AND DISK STORAGE DEVICE

BACKGROUND OF THE INVENTION

1. Field of the Invention

The present invention relates to a head position control method of a disk storage device and a disk storage device which uses a disk as an information recording medium, moves a head in a radius direction of the disk, and reads information recorded on the disk, and more particularly to a head position control method and disk storage device for reading servo information of the disk and controlling the position of the head.

2. Description of the Related Art

Information storage devices using such recording medium as a magnetic disk, optical disk, and magneto-optical disk are widely used. In such an information storage device, a read or read/write head is positioned at a predetermined track of a disk for reading or writing data.

Figure 10:
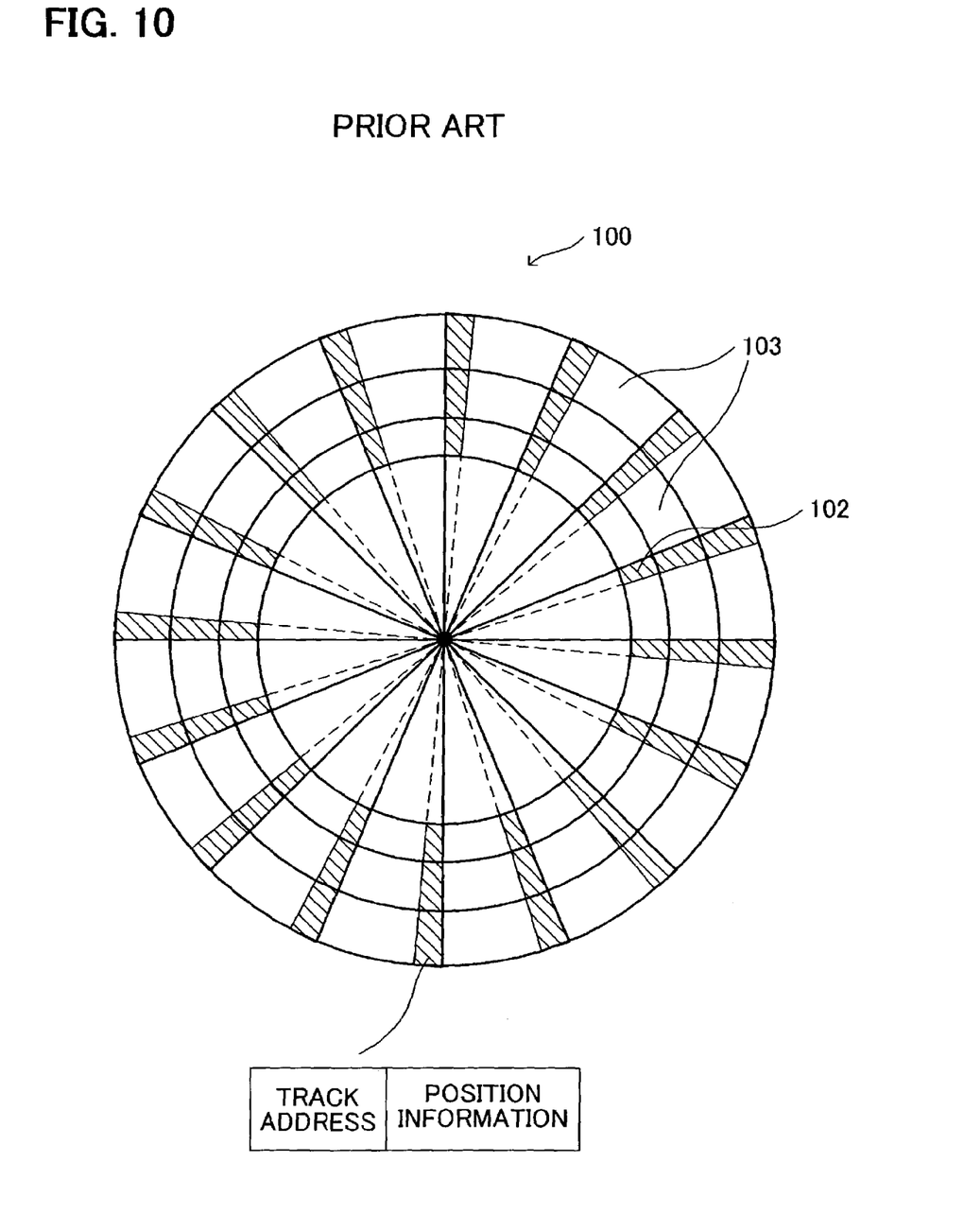
FIG. 10 is a diagram depicting the servo information of a conventional disk.
Figure 11:
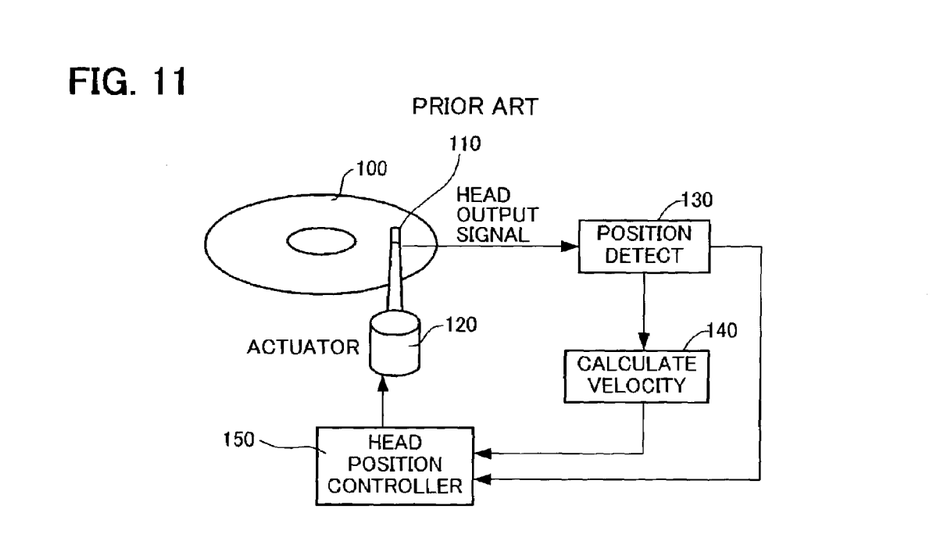
FIG. 11 is a diagram depicting a conventional magnetic disk device.
Figure 12:
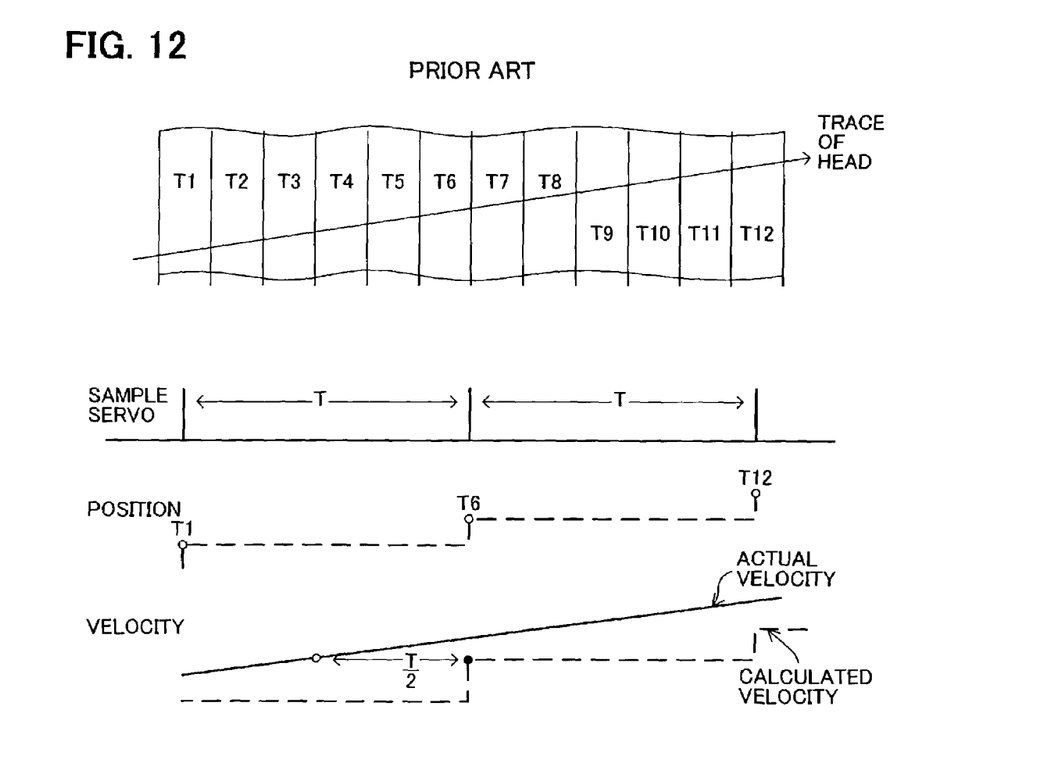
FIG. 12 is a diagram depicting a conventional head speed detection method.

FIG. 10 is a diagram depicting the servo-information of a conventional disk, FIG. 11 is a diagram depicting a head positioning control system of a conventional disk device, and FIG. 12 is a diagram depicting a conventional speed detection operation.

As FIG. 10 shows, in the case of a head positioning control system called a sector servo system used for a magnetic disk device, servo areas 102, where servo information is recorded on each sector 103 on the disk 100, are arranged radially at an equal angle. The head is positioned on the target track of the disk 100 based on this servo information. Tracks are created concentrically on a magnetic disk, and tracks are created in spirals on an optical disk.

The servo information 102 is comprised of a track address and a position information signal pattern. The track address is used for recognizing each track. And the position information signal pattern is used for determining the offset amount of the head from the center of the track.

As FIG. 11 shows, the magnetic disk device is comprised of a magnetic disk 100 which rotates, a magnetic head 110, and an actuator 120 which moves the magnetic head 110 in a radius direction of the magnetic disk 100. The position detection circuit 130 detects the position of the head 110 at every predetermined time by the servo information which the head 110 reads when the head passes through the servo area 102.

To read and write data on the disk 100, the head position control section 150 first moves the head 110 to the target track (this is called seek). Then the head 110 is followed up onto the target track until the head 110 reaches the target sector (this is called following), and when the head comes to the target sector, the head 110 writes or reads the data.

For the control to move the head 110 to the target track (seek control), speed control is generally performed. Now the flow of the control of the head position control section 150 will be described.

(1) The position detection circuit 130 detects the current head position from the servo information read by the head 110.

(2) The speed calculation circuit 140 calculates the current head speed using the head positions of the past and the current.

(3) The head position controlling section 150 calculates the target speed from the remaining distance.

(4) The head position controlling section 150 determines the difference between the target speed and the current speed, provides the result to the compensator, and calculates the current command value. The actuator 120 is driven by this current command value.

By repeating the above operation, the head is moved to the target track.

In prior art, the head speed is estimated from the position of the head instead of directly detecting the head speed. To calculate this head speed, the speed is determined by differentiating the position, as shown in FIG. 12. In other words, in the case of sample servo control, the position is detected at each predetermined interval T, and the speed is calculated by dividing the difference between the position sampled the previous time and the position sampled this time by the interval T.

However if there is an error in the information of the detected head position, the high frequency component of the positional error is emphasized as the error of the speed by the differential operation. Also in order to estimate the speed from the sampled position signals, it is regarded that the head moved for the difference between the position of the previous sampling and the position of this sampling during the sampling time, so the average speed between the previous sampling and this sampling is known the first time when the head position is sampled this time, which means that the speed is measured with a delay of the half time of the sampling time.

Such an error of the detection speed and the actual speed drops the follow up accuracy to the target speed, and decreases the phase margin of the control system. Therefore if the head movement at a higher speed is attempted, the control system becomes unstable, a high-speed seek operation and the following operations become difficult, and an increase in the speed of the track accessing time is made difficult.

SUMMARY OF THE INVENTION

With the foregoing in view, it is an object of the present invention to provide a head position control method and a disk storage device which allows high-speed access by obtaining the head speed with less error.

It is another object of the present invention to provide a head position control method and disk storage device for increasing the phase margin of the control system, and stabilizing the control system by obtaining the head speed with less error.

It is still another object of the present invention to provide a head position control method and disk storage device for detecting the speed of the head directly, so as to detect head speed with less error.

To achieve these objects, the head position control method of the present invention comprises the steps of reading a position detection pattern and a speed detection pattern provided on the tracks of the disk by the head, demodulating the current position from the position detection pattern read by the head, detecting the speed of the head from the frequency of the speed detection pattern read by the head, and controlling an actuator which moves the head to the radius direction of the disk using the demodulated current position and the detected speed.

A disk storage device according to the present invention comprises a head for reading a position detection pattern and a speed detection pattern provided on tracks of a disk, an actuator which moves the head to the radius direction of the disk, a position detection unit for demodulating the current position from the position detection pattern read by the head, a speed detection unit for detecting the speed of the head from the frequency of the speed detection pattern read by the head, and a control unit for controlling the actuator which moves the head to the radius direction of the disk from the demodulated current position and the detected speed.

In the present invention, the speed detection pattern is assigned to a servo area of the disk, and the speed is detected by the regeneration frequency, so the speed of the head can be directly detected at the servo reading timing. Therefore information on the head speed with less error can be obtained. Also there is no delay in the detection of the speed, so the phase margin of the control system increases and stability improves. Also servo reading timing is used, so the head speed can be detected synchronizing with the sample servo, which can be implemented without changing the conventional control system.

In the present invention, it is preferable that the reading step comprises a step of reading the speed detection pattern formed by a line group, which has an inclination with respect to the circumference direction and the radius direction of the disk. By this, a head speed can be easily detected at the frequency of the regeneration signal.

In the present invention, it is preferable that the reading step comprises a step of reading the speed detection pattern formed by a first line group which has an inclination with respect to the circumference direction and the radius direction of the disk, and a second line group where the first line group is axisymmetrically inverted to the circumference direction.

Also in the present invention, it is preferable that the speed detection step comprises a step of detecting the speed of the head by the difference between the frequency of the regeneration signal of the first line group and the frequency of the regeneration signal of the second line group.

By this, the fluctuation of the rotation speed of the disk can be absorbed, and an accurate speed can be detected.

In the present invention, it is preferable that the speed detection step comprises a step of sampling the regeneration signal of the speed detection pattern, a step of performing Fourier transform on the sample result and detecting the frequency, and a step of detecting speed from the detected frequency. By this, the frequency can be easily detected by digital processing.

Also in the present invention, it is preferable that the speed detection step comprises a step of sampling the regeneration signal of the speed detection pattern, a step of performing Fourier transform on the sample result and detecting the size of the frequency, a step of determining the differential signal of the regeneration signal, a step of performing Fourier transform on the differential signal and detecting the size of the frequency, and a step of detecting the speed from the detected two sizes of the frequency.

By this, the head speed can be detected accurately with a simpler operation.

Also in the present invention, it is preferable that the step of controlling the actuator comprises a step of generating the target speed based on the difference between the target position and the above mentioned detected current position, a step of calculating the speed error between the target speed and the detection speed, and a step of outputting the current command of the actuator according to the speed error. By this, the phase margin of the speed control increases, and the control system can be stably maintained even if a high speed seek is executed.

DESCRIPTION OF THE PREFERRED EMBODIMENTS

Embodiments of the present invention will now be described in the sequence of disk storage device, head speed detection method, and other embodiments, but the present invention is not restricted by the following embodiments.

[Disk Storage Device]

Figure 1:
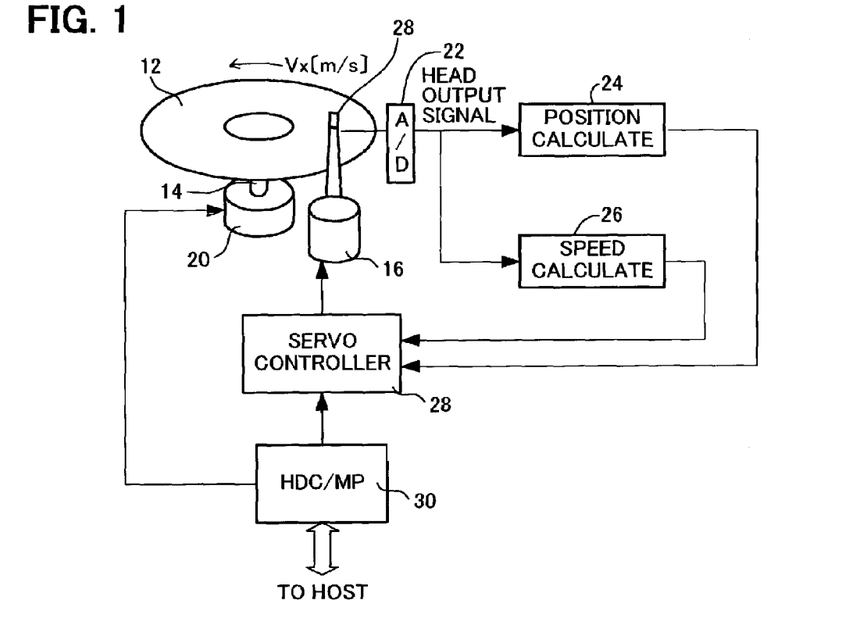
FIG. 1 is a diagram depicting the configuration of the disk storage device according to an embodiment of the present invention.
Figure 2:
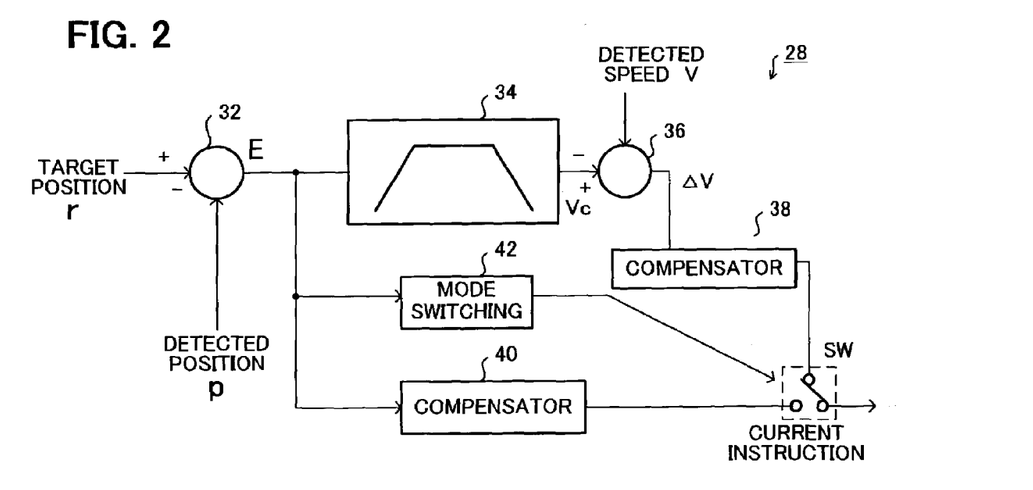
FIG. 2 is a functional block diagram depicting the servo controller in FIG. 1.
Figure 3:
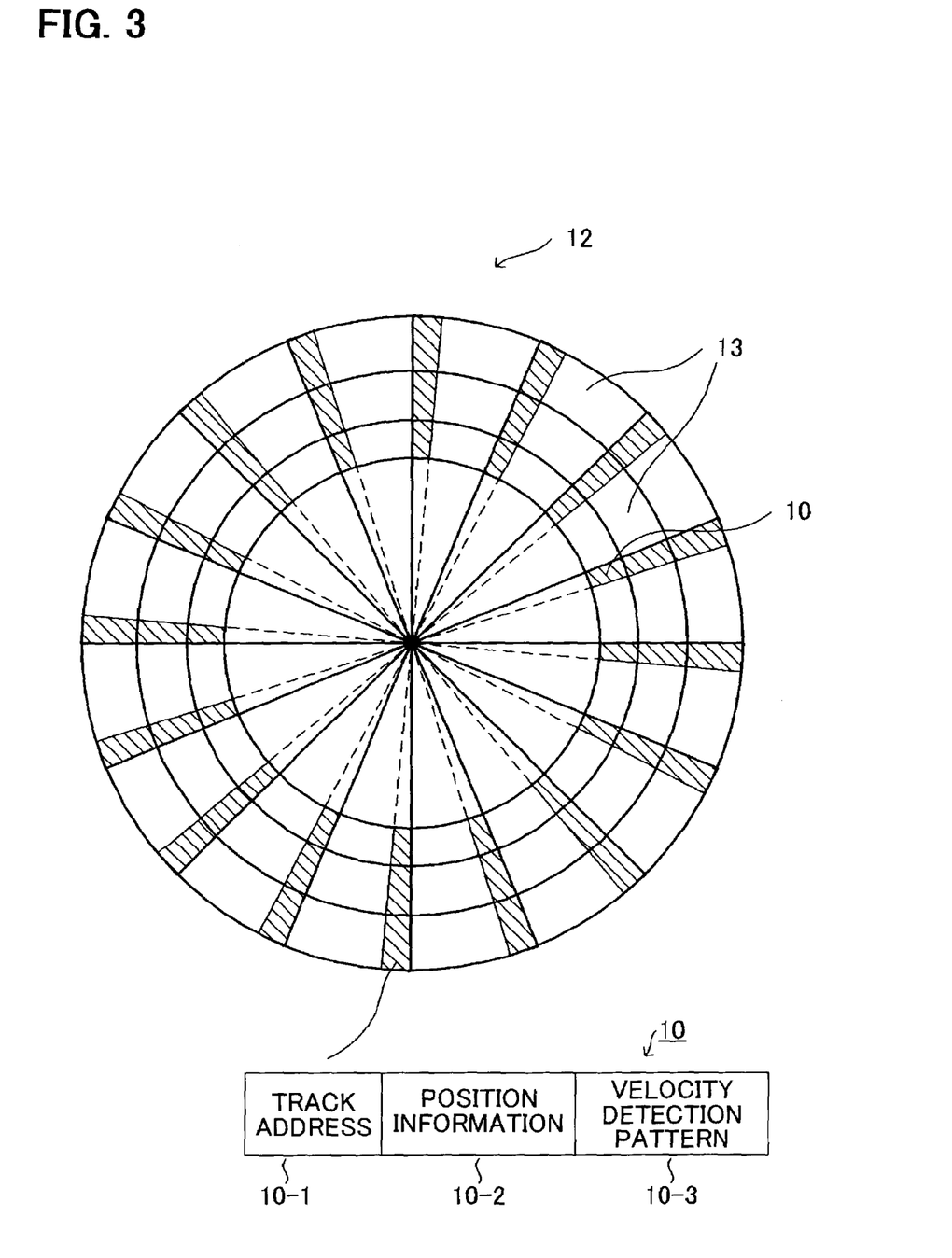
FIG. 3 is a top view depicting the magnetic disk in FIG. 1.
Figure 4:
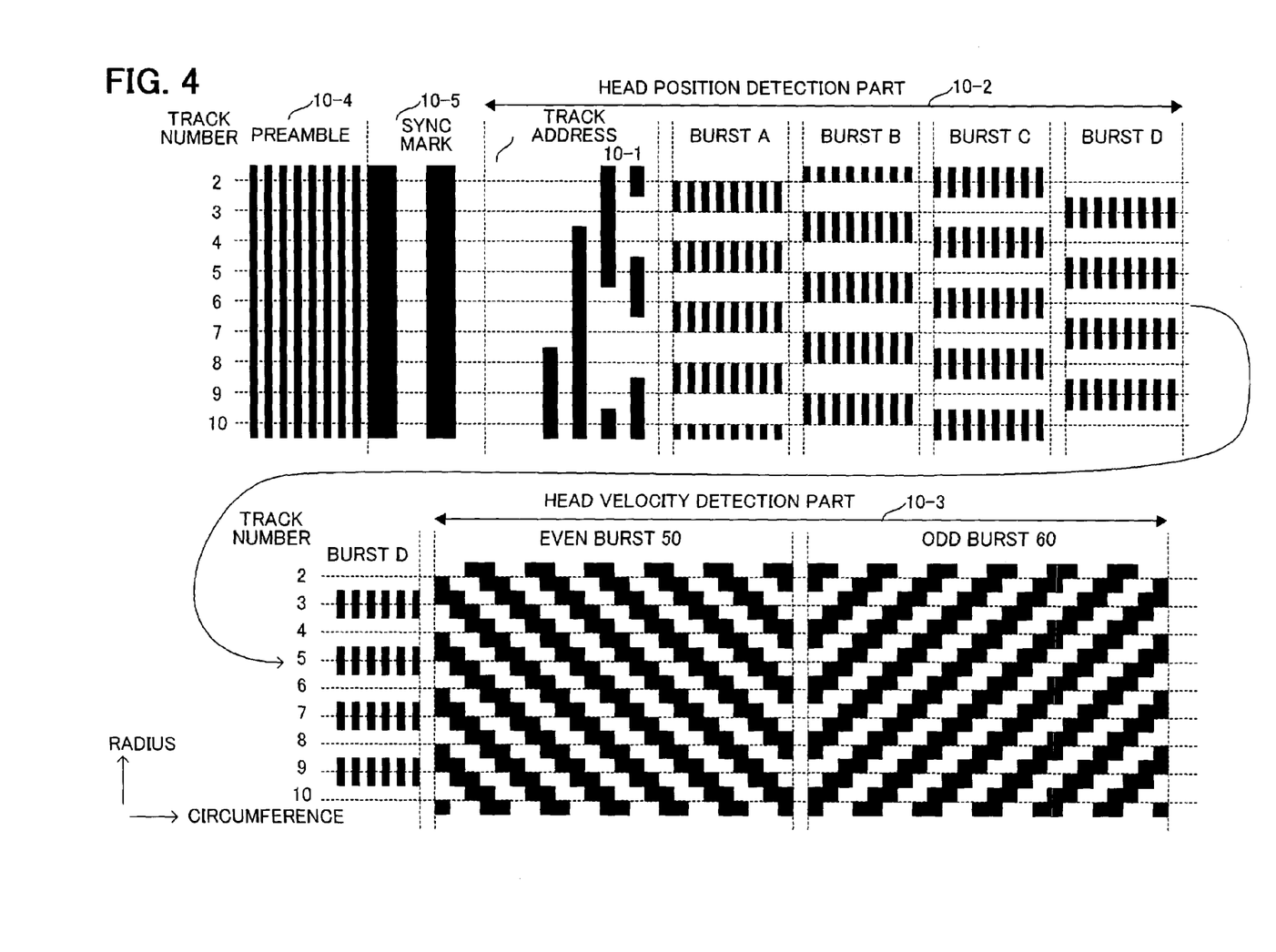
FIG. 4 is a diagram depicting the configuration of the servo area.

FIG. 1 is a diagram depicting the disk storage device according to an embodiment of the present invention, FIG. 2 is a functional block diagram depicting the servo controller in FIG. 1, FIG. 3 is a top view of the magnetic disk in FIG. 1, and FIG. 4 is a diagram depicting the configuration of the servo area in FIG. 3.

FIG. 1 shows a magnetic disk device as the disk storage device. As FIG. 1 shows, the magnetic disk 12, which is a magnetic storage medium, is installed on the rotation axis 14 of the spindle motor 36. The spindle motor 36 rotates the magnetic disk 12. The actuator 16 has a magnetic head 18 at the tip, and moves the magnetic head 18 in the radius direction of the magnetic disk 12.

The actuator 16 is comprised of an arm which rotates with the rotation axis as the center, a drive coil which is installed at the rear end of the arm, and a suspension (gimbal) which is installed at the tip of the arm. The magnetic head 18 is installed at this suspension.

These components are housed in an enclosure 10. The magnetic head 18 is comprised of a slider, read element and write element. The magnetic head 18 is comprised of read elements, which include magnetic resistance elements, layered on the slider, and write elements, which include write coils, layered thereon.

The analog digital converter 22 converts the read signals of the magnetic head 18 into digital head output signals. The position calculation circuit 24 demodulates the head position from the head output signal (head position detection information, described later in FIG. 3 and FIG. 4). The speed calculation circuit 26 detects the speed of the head from the head output signal (speed detection information described later in FIG. 3 and FIG. 4).

The servo controller 28 receives the demodulated head position and the detected head speed, as described later in FIG. 2, and performs seek and following control for the actuator 16. The hard disk controller/main controller 30 communicates with the host and performs the read/write operation of the magnetic head 18 and control of the servo controller 28.

The servo controller 28 will now be described with reference to FIG. 2. The adder 32 subtracts the detected current position P from the target position r provided by the hard disk controller/main controller 30 to calculate the positional error E. The target speed generator 34 generates the target speed Vc corresponding to the positional error (remaining distance) E according to the trapezoidal target speed curve.

The adder 36 subtracts the actual speed V from the generated target speed Vc to calculate the speed error Δv. The first compensator 38 is comprised of a PID (Proportional Integrated Differential) compensator, for example, and compensates the phase and gain of the speed error Δv and generates the current command.

The second compensator 40 is comprised of a PID (Proportional Integrated Differential) compensator, for example, and compensates the phase and gain of the positional error E, and generates the current instruction. The mode switching unit 42 switches the switch SW to speed the control side or the position control side according to the positional error E, and outputs this to the actuator 16.

In other words, the head 110 is seek-moved to a target track (called seeking) to write to or to read from the data on the disk 100. Because of this, the target position r is changed and the positional error E increases, so the mode switching unit 42 switches the switch SW to the first compensator 38.

In seek control, the position calculation circuit 24 detects the current head position from the servo information read by the head 18, and the speed calculation circuit 26 calculates the current head speed from the speed detection pattern read by the head 18.

The adder 32 subtracts the detected position P from the target position r to calculate the positional error E, and the target speed generator 34 calculates the target speed from the remaining distance (positional error) E. The adder 36 determines the difference between the target speed and the current speed and provides the result to the first compensator 38, and calculates the current command value. The actuator 16 is driven by this current command value.

The mode switching unit 42 monitors the positional error E, and switches the switch SW to the second compensator 40 when it is judged that the positional error E decreases and the head has reached near the target position. As a result, the actuator 16 is driven with the current command value which is compensated the positional error E by the second compensator 40. In other words, track following control is performed and the head 18 follows up the target track.

Now the speed detection pattern for directly detecting the speed of the head 18 will be described with reference to FIG. 3 and FIG. 4. As FIG. 3 shows, the servo areas 10 where servo information is recorded in each sector 13 on the disk are arranged radially at an equal angle. The servo information 12 is comprised of the track address 10-1 and the position information signal pattern 10-2.

The track address is used for recognizing each track. The position information signal pattern is used for determining the offset amount from the center of the track of the head.

Also according to the present invention, speed detection pattern 10-3 is newly created in the servo area 10 so as to measure the actual speed of the head 18.

As FIG. 4 shows, the servo area 10 is comprised of a preamble 10-4, sync mark 10-5, track address 10-1 and position information pattern (burst A–burst D) 10-2. The track position is detected in the track address 10-1, and the position within a track is detected in each burst A–D of the position information pattern 10-2. The position information pattern 10-2 shows a four phase pattern.

The head speed detection pattern 10-3 added in the present invention is comprised of a line group having inclination with respect to the circumference direction and the radius direction of the disk 12. According to the present embodiment, even pattern 50, which is a line group having a certain inclination, and odd pattern 60, where the above pattern is axisymmetrically inverted to the circumference direction, are created adjacent to each other.

The patterns 50 and 60 of the line group having an inclination function such that the frequency of the regeneration signals regenerated by the head 18 changes according to the moving speed of the head in the radius direction when the head 18 has speed in the radius direction. Therefore the head speed can be detected by creating the frequency detection unit for detecting the frequency of the regeneration signal when the head 18 regenerates the line group patterns 50 and 60.

[Head Speed Detection Method]

Figure 5:
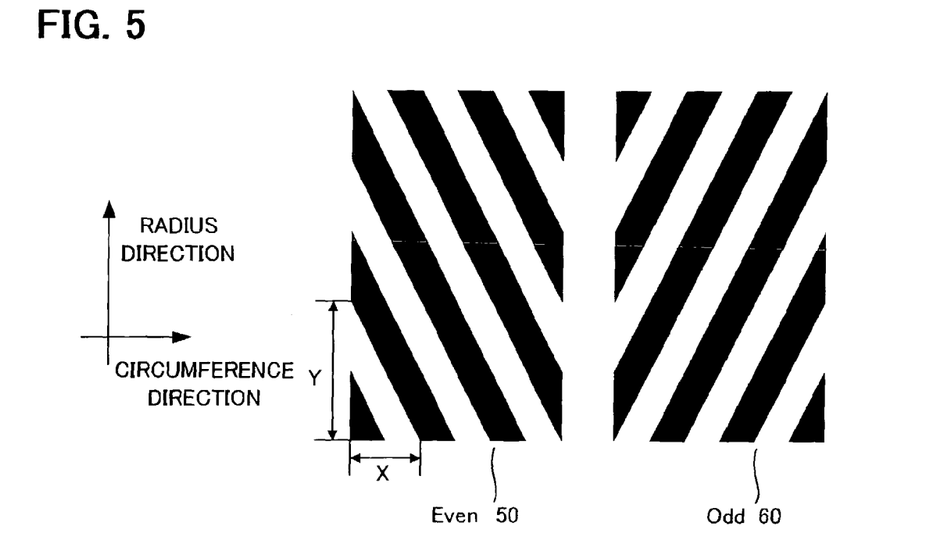
FIG. 5 is a diagram depicting the speed detection pattern according to an embodiment of the present invention.
Figure 6:
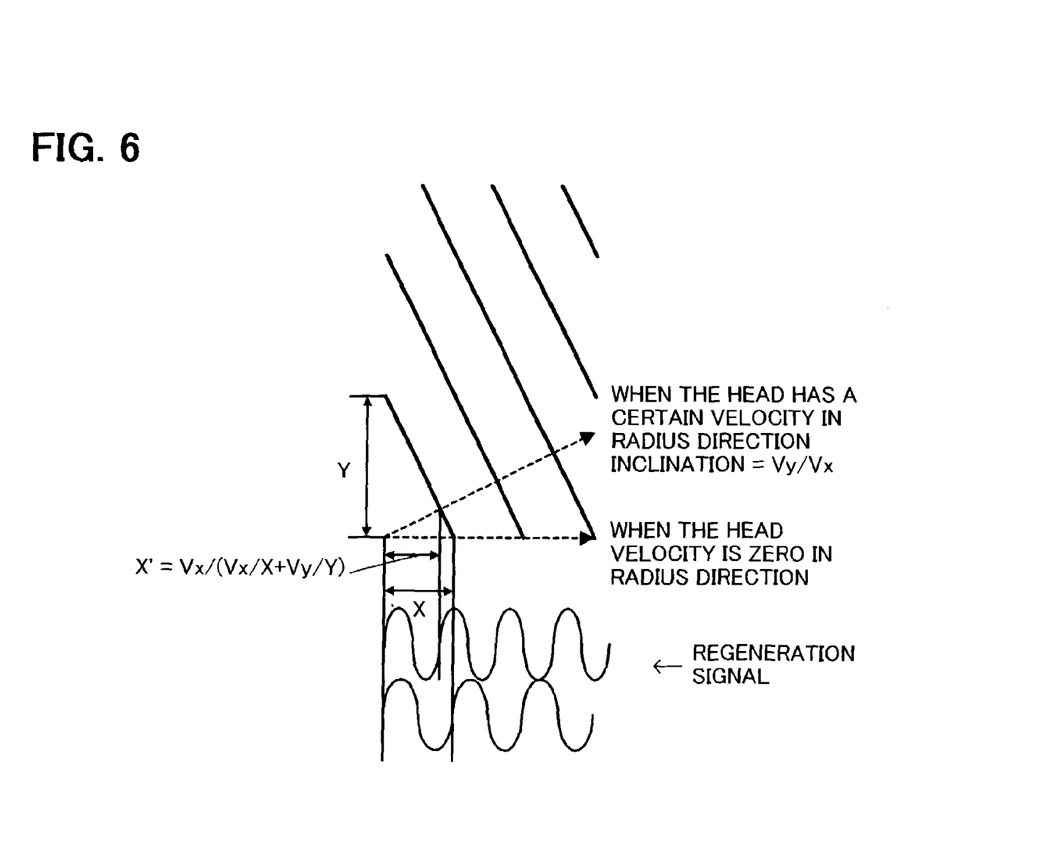
FIG. 6 is a diagram depicting the speed detection method using the speed detection pattern in FIG. 5.

Now the speed detection method using the speed detection pattern in FIG. 4 will be described. FIG. 5 is a diagram depicting the speed detection pattern in FIG. 4, and FIG. 6 shows the relationship of cycles between the head speed and the regeneration signals. As FIG. 5 shows, the inclination of the lines of the speed detection pattern is defined as X in the circumference direction and as Y in the radius direction. FIG. 6 shows points which become the same phase in the even pattern 50 which are connected, and which are parallel lines. The phase of the regeneration signal makes one rotation when the head 18 moves from one line to the next line.

Here, as mentioned above, the cycle of the speed detection pattern in the circumference direction is defined as X [m], the cycle thereof in the radius direction as Y [m], the speed of the head 18 in the circumference direction, that is the rotation speed of the disk 12, as Vx [m/s], and the speed of the head 18 in the radius direction as Vy [m/s].

When the moving distance of the head in the circumference direction is X' (=Vx/(Vx/X+Vy/Y)), phase makes one rotation.

Therefore the frequency fe of the regeneration signals at the speed Vy is fe=Vx/X'=Vx/X+Vy/Y.

In the same way, in the case of odd pattern 60, the frequency fo of the regeneration signal at the speed Vy is fo=Vx/X−Vy/Y.

When the rotation speed Vx of the disk 12 is completely constant, the speed Vy of the head in the radius direction is calculated using one of these frequencies. For example, Vy is determined as follows using fe.

$$Vy=(fe-Vx/X) \cdot Y$$

Since Vx, X and Y are known, the speed Vy of the head 18 in the radius direction can be detected by measuring the frequency of the regeneration signals.

Figure 7:
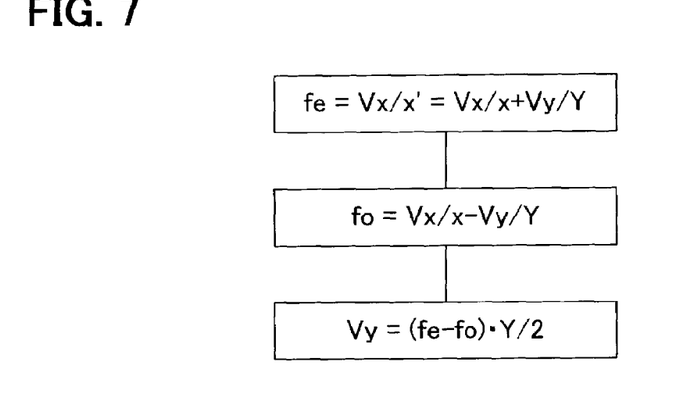
FIG. 7 is a flow chart depicting the speed detection processing in FIG. 5.

Actually, however, the rotation speed Vx of the disk 12 fluctuates slightly, so as FIG. 7 shows, the frequency fe of the regeneration signals of even pattern 50 and the frequency fo of the regeneration signals of odd pattern 60 are measured, and the fluctuating amount of the rotation can be cancelled by the following formula using the difference of the frequencies.

$$Vy=(fe-fo)\cdot Y/2$$

In this way, the speed of the head in the radius direction can be determined. Since the speed detection pattern is assigned to the servo area of the disk, the speed of the head can be directly detected at the timing of the servo reading. Therefore information on the head speed with less error can be obtained. Also no delay occurs in the detection of the speed, so the phase margin of the control system increases and stability improves. Also the timing of the servo reading is used, so the head speed can be detected synchronizing with the sample servo, and control of the head speed can be implemented easily without using the conventional control system.

Figure 8:
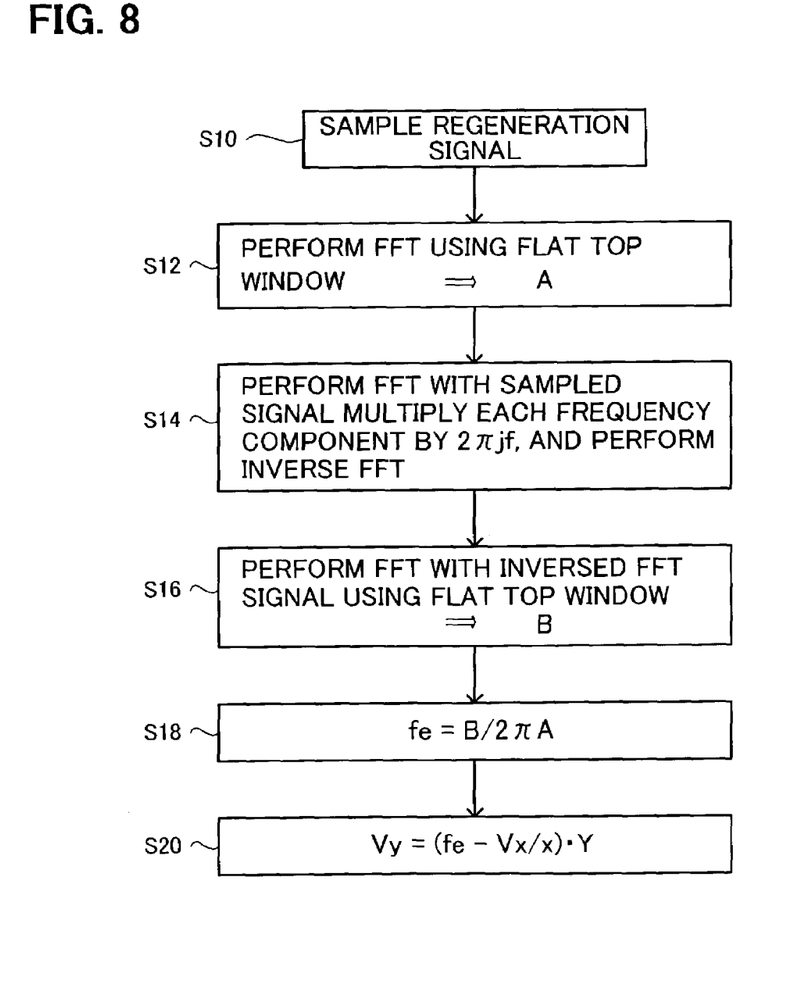
FIG. 8 is a flow chart depicting the speed detection processing according to another embodiment of the present invention.
Figure 9:
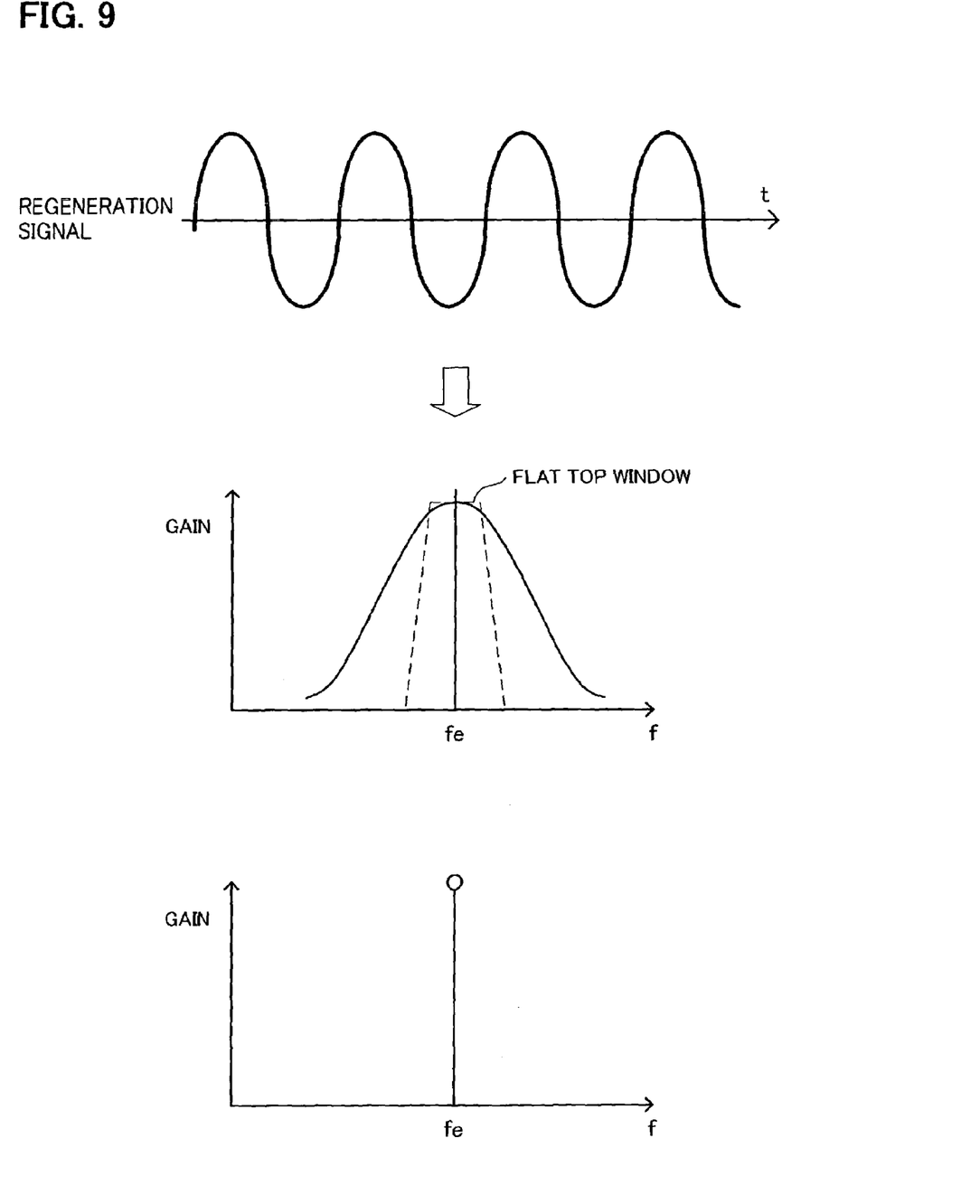
FIG. 9 is a diagram depicting the operation of the processing in FIG. 8.

For digital processing of frequency analysis, discrete Fourier transform (DFT) is suitable. In other words, a continuous waveform is sampled, and the frequency of the continuous waveforms is detected by digital processing using a discrete Fourier transform. FIG. 8 is a flow chart depicting the head speed detection processing using Fourier transform according to an embodiment of the present invention, and FIG. 9 is a diagram depicting operation thereof.

(S10) At first the regeneration signals read by the head 18 are sampled.

(S12) Then FFT (Fast Fourier Transform) is performed on the sampled signals using a flat top window as a window function, so as to determine the amplitude of the fundamental frequency component. This is regarded as A. As FIG. 9 shows, when DFT (Digital Fourier Transform) is performed by sampling a continuous waveform (regeneration signals) with an unknown cycle, the value of FFT differs depending on the position of the waveform which is sampled out, and a frequency spectrum, other than the fundamental frequency, appears. The time window function is a weight function to make the start point and the end point of the sampling period to be continuous, and a rectangular, hanning window, hamming window, and flat top window are known. Here a flat top window is used as a time window, which does not cause so many changes in the amplitude of the frequency component even if the time window length is not an integral multiple of the fundamental cycle.

(S14) FFT is performed on the sample signals, each frequency component is multiplied by $2\pi jf$ (j is an imaginary unit and f is the frequency), and inverse FFT is performed. With this, the differential waveform of a regeneration signal is determined.

(S16) FFT is performed on the differential waveform of a regeneration signal using a flat top window as the window function, and the amplitude of the fundamental frequency component is determined. This is regarded as B.

(S18) The target frequency fe is determined by $B/2\pi A$.

(S20) The speed Vy of the head in the radius direction is determined by the following formula, as described above.

$$Vy=(fe-Vx/X)\cdot Y$$

When the above processing is expressed by the time function with the regeneration signal $y=A\cdot\sin 2\pi fet$, the size "A" is obtained in the step S12, and the differential signal thereof $dy/dt=2\pi fe\cdot A\cdot\cos 2\pi fet$ is obtained in step S14. In step S16, the size $B="2\pi fe\cdot A"$ is obtained. Therefore in step S18, $B/2\pi A=fe$ is obtained.

To perform the processing in FIG. 7, frequency fo of the odd pattern is calculated, and the speed Vy is calculated using the formula in FIG. 7 in the same way.

To use such an FFT, the frequency of the regeneration signals of the speed detection pattern can be easily detected, and the head speed can be accurately and easily detected by digital processing.

[Other Embodiments]

The speed detection pattern has been described with two even and odd patterns, but this speed detection can be implemented by one of these patterns. A disk with a disk shape was described, but a disk with a card shape may be used. Also the disk storage device was described using a magnetic disk drive, but the present invention can be applied to other disk devices, such as an optical and magneto-optical disk.

The present invention was described by the above embodiments, but various modifications are possible within the scope of the essential character of the present invention, and these shall not be excluded from the technical scope of the present invention.

Since a speed detection pattern is assigned to the servo area of the disk, and speed is detected by the frequency of the regeneration signals, the head speed can be directly detected at the timing of the servo reading. Therefore information on head speed with less error can be obtained. Since there is no delay in the detection of the speed, the phase margin of the control system increases and stability improves. Also the timing of the servo reading is used, so the head speed can be detected synchronizing with the sample servo, and control of the head speed can be easily implemented without changing the conventional control system.

What is claimed is:

1. A head position control method for positioning a head on a desired track of a rotating disk, comprising steps of:
    reading a position detection pattern and a speed detection pattern provided on said tracks of said disk by said head;
    demodulating a current position from the position detection pattern read by said head;
    detecting a speed of said head from frequency of the speed detection pattern read by said head; and
    controlling an actuator which moves said head in the radius direction of said disk using said demodulated current position and said detected speed.

2. The head position control method according to claim 1, wherein said reading step comprises:
    a step of reading said speed detection pattern formed by a line group which has an inclination with respect to the circumference direction and the radius direction of said disk.

3. The head position control method according to claim 2, wherein said reading step comprises a step of reading said speed detection pattern created by a first line group which has an inclination with respect to the circumference direction and the radius direction of said disk, and a second line group where said first line group is axisymmetrically inverted to the circumference direction.

4. The head position control method according to claim 3, wherein said speed detection step comprises a step of detecting the speed of said head by the difference between the frequency of a regeneration signal of said first line group and the frequency of a regeneration signal of said second line group.

5. The head position control method according to claim 1, wherein said speed detection step comprises:

a step of sampling a regeneration signal of said speed detection pattern;

a step of performing Fourier transform on the sample result and detecting said frequency; and a step of detecting the speed from the detected frequency.

6. The head position control method according to claim 1, wherein said speed detection step comprises:

a step of sampling a regeneration signal of said speed detection pattern;

a step of performing Fourier transform on the sample result and detecting the size of said frequency;

a step of determining the differential signal of said regeneration signal;

a step of performing Fourier transform on said differential signal and detecting the size of said frequency; and a step of detecting the speed from the detected two sizes.

7. The head position control method according to claim 1, wherein said step of controlling the actuator comprises:

a step of generating a target speed based on the difference between a target position and said detected current position;

a step of calculating a speed error between said target speed and said detected speed; and a step of outputting the current command of said actuator according to said speed error.

8. A disk storage device for at least reading data on a track of a disk by a head, comprising:

a head for reading a position detection pattern and a speed detection pattern formed on said track of said disk;

an actuator for moving said head in the radius direction of said disk;

a position detection unit for demodulating a current position from the position detection pattern read by said head;

a speed detecting unit for detecting a speed of said head from frequency of the speed detection pattern read by said head; and a control unit for controlling said actuator which moves said head in the radius direction of said disk from said demodulated current position and said detected speed.

9. The disk storage device according to claim 8, wherein said speed detection pattern of the disk is created by a line group which has an inclination with respect to the circumference direction and the radius direction of said disk.

10. The disk storage device according to claim 9, wherein said speed detection pattern of the disk is created by a first line group which has an inclination with respect to the circumference direction and the radius direction of said disk, and a second line group where said first line group is axisymmetrically inverted to the circumference direction.

11. The disk storage device according to claim 10, wherein said speed detecting unit detects the speed of said head by the difference between the frequency of a regeneration signal of said first line group and the frequency of a regeneration signal of said second line group.

12. The disk storage device according to claim 8, wherein said speed detecting unit samples a regeneration signal of said speed detection pattern, performs Fourier transform on the sample result, detects said frequency, and detects the speed from the detected frequency.

13. The disk storage device according to claim 8, wherein said speed detecting unit samples a regeneration signal of said speed detection pattern, performs a Fourier transform on the sample result, detects the size of said frequency, determines the differential signal of said regeneration signal, performs a Fourier transform on said differential signal, detects the size of said frequency, and detects the speed from the detected two sizes.

14. The disk storage device according to claim 8, wherein said control unit generates a target speed based on the difference between a target position and said detected current position, then calculates a speed error between said target speed and said detection speed, and outputs the current instruction of said actuator according to said speed error.

* * * * *